United States Patent
Mihm

(10) Patent No.: US 9,663,061 B2
(45) Date of Patent: May 30, 2017

(54) CENTER SIDE IMPACT AIRBAG MODULE WITH CONTROL TETHER

(71) Applicant: TK Holdings Inc, Auburn Hills, MI (US)

(72) Inventor: Russell Joseph Mihm, Beverly Hills, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 14/701,044

(22) Filed: Apr. 30, 2015

(65) Prior Publication Data
US 2015/0314748 A1    Nov. 5, 2015

Related U.S. Application Data

(60) Provisional application No. 61/987,181, filed on May 1, 2014.

(51) Int. Cl.
| | |
|---|---|
| *B60R 21/2338* | (2011.01) |
| *B60R 21/207* | (2006.01) |
| *B60R 21/231* | (2011.01) |
| *B60R 21/00* | (2006.01) |

(52) U.S. Cl.
CPC ........ *B60R 21/2338* (2013.01); *B60R 21/207* (2013.01); *B60R 21/23138* (2013.01); *B60R 2021/0006* (2013.01); *B60R 2021/23146* (2013.01); *B60R 2021/23161* (2013.01); *B60R 2021/23386* (2013.01)

(58) Field of Classification Search
CPC  B60R 2021/23386; B60R 2021/23146; B60R 2021/23161; B60R 2021/0006; B60R 21/2338; B60R 21/23138; B60R 21/207

USPC .......................................... 280/743.2, 730.2
See application file for complete search history.

(56) References Cited

U.S. PATENT DOCUMENTS

| | | | |
|---|---|---|---|
| 6,045,151 A | 4/2000 | Wu | |
| 2011/0049852 A1* | 3/2011 | Kibat | ............... B60R 21/23138 280/743.2 |
| 2011/0278825 A1 | 11/2011 | Gumprecht et al. | |
| 2013/0076014 A1 | 3/2013 | Thomas et al. | |

(Continued)

FOREIGN PATENT DOCUMENTS

| | | | | |
|---|---|---|---|---|
| GB | 2357999 A | * | 7/2001 | ........... B60R 21/207 |
| JP | 2011057208 A | * | 3/2011 | ......... B60R 21/2338 |
| KR | 10-2013-0010569 A | | 1/2013 | |

OTHER PUBLICATIONS

International Search Report and Written Opinion for PCT/US2015/028508; mailed Jul. 27, 2015; 11 pages.

*Primary Examiner* — Keith Frisby
(74) *Attorney, Agent, or Firm* — Gordon & Rees LLP

(57) ABSTRACT

A center side impact airbag module that is mountable to upper and lower locations of a vehicle seat includes an inflatable airbag cushion, a first tether, and a second tether. The first tether has a first end configured to connect to one of the airbag cushion, a mounting member and the vehicle seat at the upper location of the vehicle seat and a second end connected to a forward portion of the airbag cushion. The second tether has a first end configured to connect to one of the airbag cushion, the mounting member and the vehicle seat at the lower location of the vehicle seat and a second end connected to the forward portion of the airbag cushion.

19 Claims, 3 Drawing Sheets

(56) References Cited

U.S. PATENT DOCUMENTS

2013/0079208 A1* 3/2013 Wiik ............... B60R 21/23138
                                                            493/405
2014/0008898 A1   1/2014 Tracht

* cited by examiner

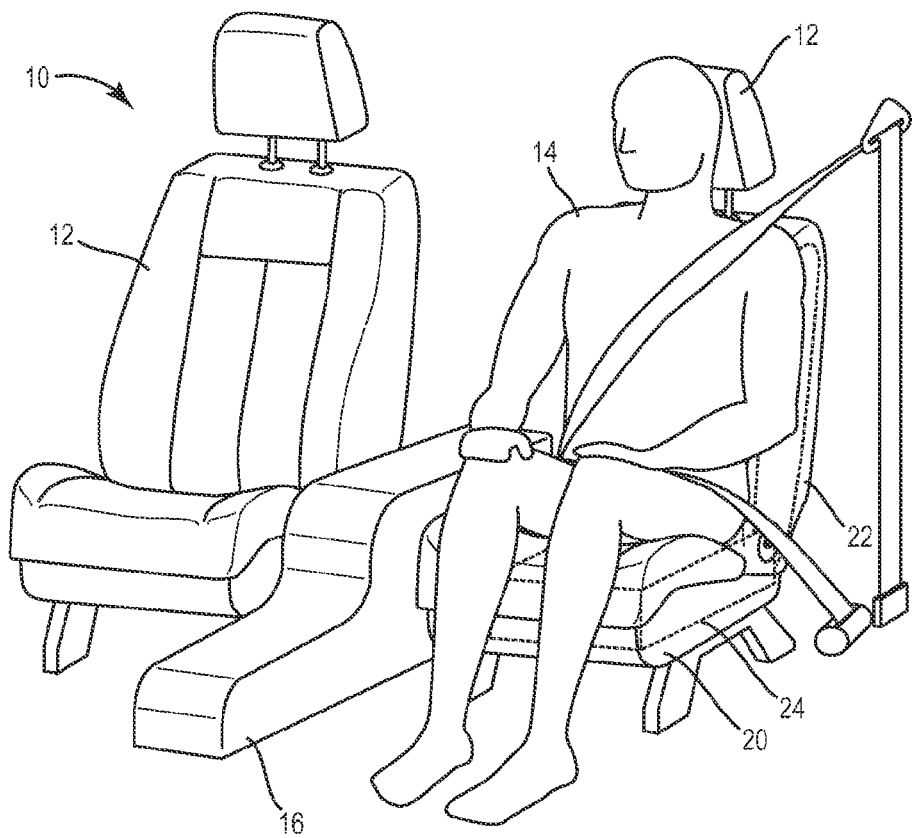
FIG. 1
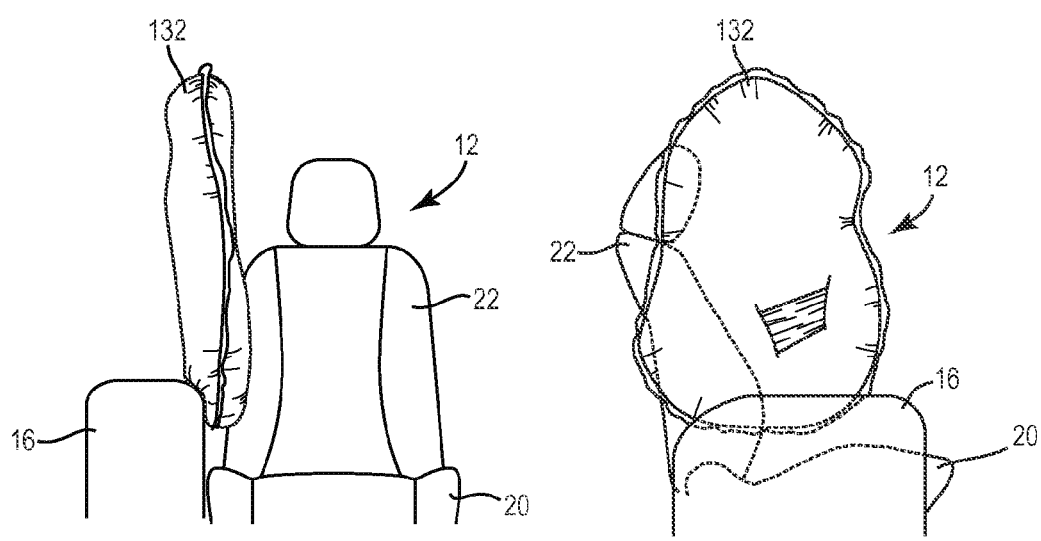
FIG. 2
(PRIOR ART)
FIG. 3
(PRIOR ART)

CENTER SIDE IMPACT AIRBAG MODULE WITH CONTROL TETHER

CROSS-REFERENCE TO RELATED APPLICATIONS

This application claims the benefit of and priority to U.S. Provisional Patent Application No. 61/987,181, which was filed on May 1, 2014. U.S. Provisional Patent Application No. 61/987,181 is incorporated by reference herein in its entirety.

BACKGROUND

The present application relates generally to the field of airbag modules. More specifically, the present application relates to a center side impact airbag (CSIAB) module having an airbag cushion with a tether configured to improve the cross-car retention ability of the inflated (e.g., deployed) airbag cushion.

CSIAB modules may use inflated fabric tubes and other elements to reduce occupant cross-car travel in a far-side crash event (e.g., the inboard travel of an occupant on the driver side during an impact to the passenger side). Some current CSIAB modules, as shown in FIGS. 2 and 3, may use console "interaction" whereby the lower inflated cushion tube of an airbag cushion 132 is designed with a predetermined distance that butts or rubs against a vehicle center console 16 and wedges between the vehicle console 16 and occupant to reduce cross-car travel. The interaction also acts as a means to keep the cushion from pivoting out of the way when engaged by the shoulder, and increases the likelihood that the cushion will form a barrier between occupants or an occupant and an intruding object.

However, some modern vehicles demand a smaller module package in order to fit into smaller vehicle environments, which drives the need for smaller volume cushions to meet packaging requirements and lower operating pressures through reduced inflator output. The cushion volume reduction, specifically for CSIAB applications, typically results in the elimination of console interaction, as the removal of the console entails reducing a portion of the lower inflated cushion tube volume so that it no longer interacts with the center console when engaged by an occupant during a crash event.

Some current CSIAB modules, when lacking the interaction with the center console, can deploy in such a way that they allow a large amount of excursion or travel of the occupant's shoulder past the inner edge of the center console. For example, a CSIAB module may allow an excursion of less than 50 mm with 110 mm of interaction with the center console, an excursion of approximately 126 mm with 50 mm of interaction with the center console, and an excursion of approximately 162 mm with 20 mm of interaction with the center console.

Console interaction can also result in the deploying cushion catching on the console edge (e.g., in vehicles with large amounts of seat travel ability) and not reaching the proper position for good restraint. A center side impact airbag may deploy laterally, in a cross car direction before springing up into position and can be difficult to control. Large interaction cushions mounted to seat structures with large amounts of travel (e.g., fore/aft, lateral, up/down, etc.) may become caught on the rear edge of the center console and not reach position for proper restraint.

SUMMARY

One aspect of this application relates to a center side impact airbag module that is mountable to upper and lower locations of a vehicle seat. The airbag module includes an inflator, an inflatable airbag cushion, a first tether, and a second tether. The first tether has a first end configured to connect to one of the airbag cushion, a mounting member and the vehicle seat at the upper location of the vehicle seat and a second end connected to a forward portion of the airbag cushion. The second tether has a first end configured to connect to one of the airbag cushion, the mounting member and the vehicle seat at the lower location of the vehicle seat and a second end connected to the forward portion of the airbag cushion.

Another aspect of this application relates to a center side impact airbag module that is mountable to a connection location of a seat member of a vehicle seat. The airbag module includes an inflatable airbag cushion, a first tether, and a second tether. The first tether has a first end configured to connect to one of the airbag cushion, a mounting member and the seat member at the connection location of the seat member and a second end connected to a first forward position of the airbag cushion. The second tether has a first end configured to connect to one of the airbag cushion, the mounting member and the seat member at the connection location of the seat member and a second end connected to a second forward portion of the airbag cushion.

Yet another aspect of this application is related to a center side impact airbag module that is mountable to a vehicle seat member at first and second locations. The airbag module includes an inflatable airbag cushion, a mounting member, and a substantially Z-shaped tether system configured to influence the trajectory of the airbag cushion upon deployment. The mounting member is configured to connect to the vehicle seat member at the first and second locations. The tether system includes a first portion, a second portion, and a third portion. The first portion extends between a first portion of the airbag cushion and the mounting member at the first location of the vehicle seat member. The second portion extends between the mounting member at the first location of the vehicle seat member and a second portion of the airbag cushion. The third portion extends between the second portion of the airbag cushion and the mounting member at the second location of the vehicle seat member.

It is to be understood that both the foregoing general description and the following detailed description are exemplary and explanatory only, and are not restrictive of the invention as claimed.

BRIEF DESCRIPTION OF THE DRAWINGS

Features, aspects and advantages of the present invention will become apparent from the following description and the accompanying exemplary embodiments shown in the drawings, which are briefly described below.

FIG. 1 is a schematic perspective view of a vehicle interior.

FIG. 2 is a front view of a prior art center side impact airbag module in a deployed configuration between a vehicle seat and a center console.

FIG. 3 is an inboard side view of the prior art airbag of FIG. 2.

DETAILED DESCRIPTION

Figures 4, 5:
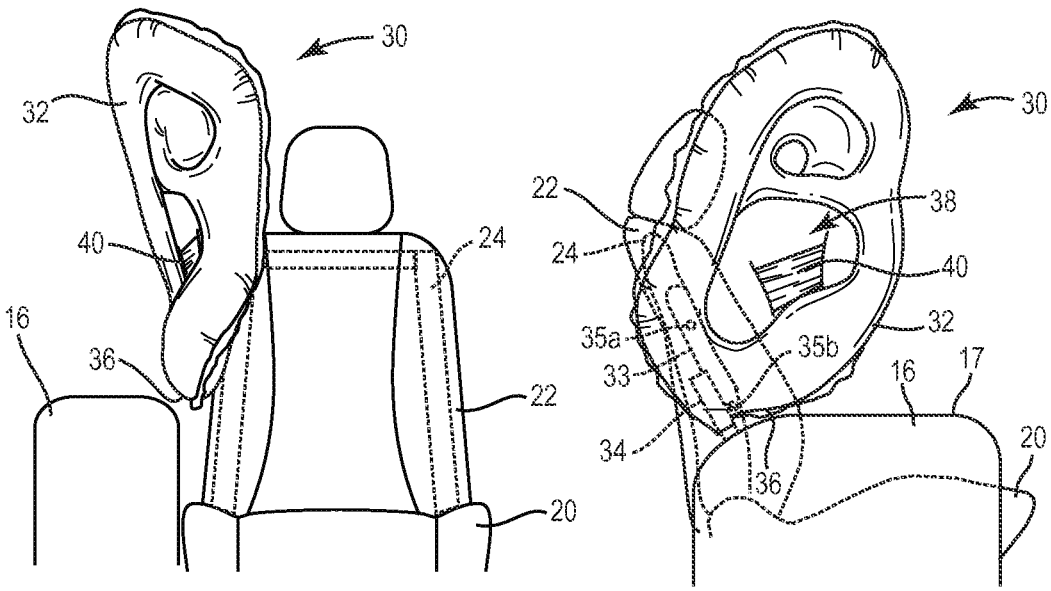
FIG. 4 is a front view of a center side impact airbag module in a deployed configuration between a vehicle seat and a center console, according to an exemplary embodiment.
FIG. 5 is an inboard side view of the center side impact airbag module of FIG. 4.

Referring in general to FIGS. 4-8, a center side impact airbag module is shown that includes an arrangement of tethering the airbag cushion to improve lateral restraint when the majority of the cushion's "working area" (i.e., the region of the cushion where the occupant initially contacts and remains in contact with) is located above the module mounting apparatus upper vehicle seat frame attachment point. The tethering arrangement includes a first tether and a second tether with uncommon initial attachment points and a common secondary attachment point, such as located at or proximate to a forward edge of the inflated cushion. In other words, the first and second tethers are connected together at a first connection location (e.g., the common secondary attachment location), the first tether is also connected at a second connection location, and the second tether is also connected at a third connection location, which is different than the second connection location. The first tether and/or the second tether may be configured to be under tension when the airbag is deployed. The arrangement scheme of the tethers simulates the cushion's interaction with a vehicle center console to improve restraint by limiting cushion pivoting and/or bending and fully engaging the entirety of the module mounting apparatus. The tethers are tailored to control the deployment trajectory of the cushion in order to avoid interference with a vehicle center console which could potentially hinder the cushion's ability to reach proper restraint position.

A vehicle includes a vehicle interior having at least one vehicle seat configured to receive at least one occupant. FIG. 1 illustrates a vehicle interior 10 including a pair of vehicle seats 12 with a center console 16 disposed between the two seats 12. Each vehicle seat 12 is configured to receive a single occupant 14. Thus, the vehicle seats 12 are provided in a row and are separated by a structure, such as the center console 16. The center console 16 may in some embodiments include storage compartments, trim components, a gear shift, etc. The vehicle seat 12 includes a generally horizontal lower portion or seat bottom 20 that is coupled to the vehicle and an upper portion or seat back 22 that extends upward from the rear end of the seat bottom 20. The seat bottom 20 may be coupled to the vehicle with a mounting system that allows the vehicle seat 12 to be moved relative to the vehicle (e.g., fore/aft, lateral, up/down, etc.). The seat back 22 may be connected to the seat bottom 20 through a recliner mechanism that allows the seat back 22 to tilt or pivot relative to the seat bottom 20. Each of the seat bottom 20 and the seat back 22 include a supporting frame 24. A cushion such as a foam pad may be coupled to the frame 24 and a trim cover may surround the cushion.

The seat 12 may be configured to include an airbag device. As shown in FIGS. 4-8, the vehicle seat 12 includes a CSIAB module 30 that is provided within the seat back 22, such as under the cushion and trim cover. The CSIAB module 30 includes an inflatable airbag cushion 32 and a gas generator (e.g., an inflator) 34 configured to generate gas to inflate the airbag cushion 32. The CSIAB module 30 may be coupled directly to the seat frame 24 with a mounting device. For example, the CSIAB module 30 may include a mounting bracket 33 (e.g., fastener, plate, etc.) that couples the module directly to the frame member 26. In a side impact, the airbag cushion 32 inflates and is driven away from the vehicle seat 12 to be positioned along the side of the upper body of the occupant 14 of the vehicle seat 12 to limit the lateral (e.g., cross-car, side to side, etc.) movement of the occupant. The occupant load on the airbag cushion 32 is transferred through the mounting bracket 33 to the seat frame 24.

Referring to FIGS. 4 and 5, the airbag cushion 32 is mounted to the seat frame 24 supporting the seat back 22. For example, the cushion 32 may be coupled to an inboard side of a frame member 26 at mounting locations (e.g., upper/lower location(s), connection location(s), location(s), etc.), shown as openings 28 in the frame member 26 in FIG. 7. According to an exemplary embodiment, the mounting bracket 33 of the CSIAB module 30 includes threaded studs, shown as an upper stud 35a and a lower stud 35b, that pass through the openings 28 to extend to the opposite side of the frame member 26 (see FIG. 7-8). Nuts are threaded onto the studs 35 and are tightened down to exert a clamping load on the frame member 26 to couple the mounting bracket 33 to the seat frame 24. In other exemplary embodiments, the mounting bracket may include more or less than two studs and/or the mounting bracket may engage integrally formed mounting features in the frame member 26 (e.g., clips, tabs, notches, etc.). In other exemplary embodiments, the CSIAB module 30 may include one or more secondary brackets provided on the inboard side of the frame member 26 that engage the studs 35. The CSIAB module 30 is mounted such that the inflated cushion 32 is positioned above the center console 16 and has minimal (e.g., negligible) or no console interaction, measured from a top surface 17 of the console 16 to the lower edge 36 of the cushion 32 (see FIG. 5).

Figure 6:
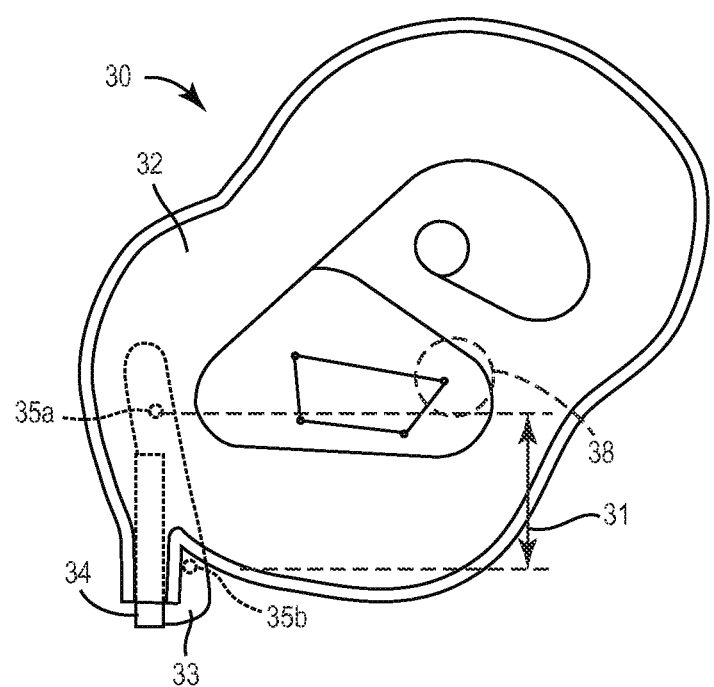
FIG. 6 is a plan view of an airbag cushion for the center side impact airbag module of FIG. 4.

Referring to FIGS. 5 and 6, the cushion 32 includes a contact area 38 (e.g., working area) where the shoulder of the occupant 14 contacts the cushion 32. The cushion 32 is configured to restrain the occupant 14 in the cross-car direction by capturing the shoulder of the occupant 14 and limiting the movement of the head of the occupant 14. The cushion 32 is configured to limit the movement of the occupant 14, such that the head of the occupant 14 does not pass beyond a far edge of the center console 16, to reduce the likelihood that the occupant will contact an object or other occupant in a neighboring seat 12. According to an exemplary embodiment, the contact area 38 is positioned above the upper stud 35a. Further, because the airbag cushion 32 does not interact with the center console 16, the lower edge 36 of the airbag cushion 32 is unsupported and is more susceptible to bending and twisting off the occupant 14 and not cupping the shoulder, such as when the cushion is supported by the console 16.

Airbag cushions of CSIAB modules that are supported by a console during deployment typically have at least a majority of the contact area provided between the mounting locations (e.g., the upper and lower studs/mounts). The supported cushions also have a larger relative size (e.g., volume) and tend to extend more in a fore-and-aft direction. This arrangement leads to more of the contact area being supported by the bracket to transfer energy from the occupant to the bracket through the cushion. For example, the unsupported cushions may have a volume of around 10 liters, whereas for comparison, the cushions supported by the console may have a volume of around 11 liters. To accommodate the reduction in size (e.g., volume) and the loss of console support, the unsupported cushions of the CSIAB modules, as discussed in this application, tend to be shifted higher on the bracket to meet occupant coverage and eliminate the console interaction. This arrangement relocates the contact area 38, or at least a majority of the contact area, above the upper stud 35a and outside of the area 31 between the studs (shown in FIG. 6). Since the lower portion (e.g., bottom) of the cushion is configured to be unsupported, the tethers 42, 44 (see FIG. 7) counteract the bending and twisting of the cushion (e.g., the lower portion) that may otherwise occur (due to the loss of support at the lower portion) when loaded by an occupant.

Figure 7:
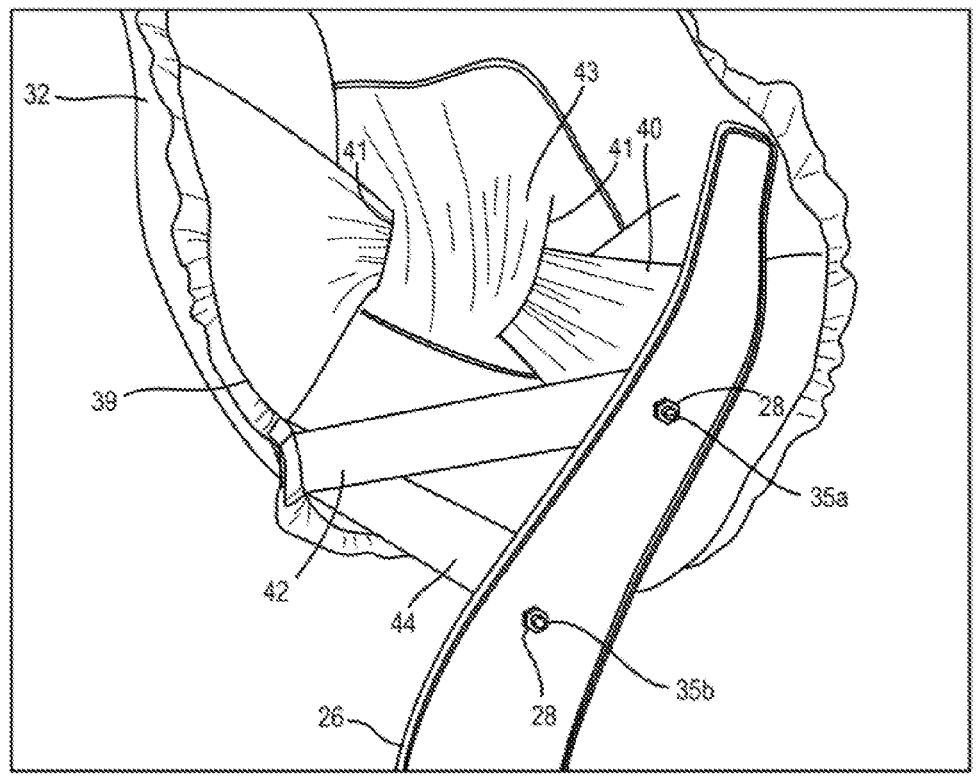
FIG. 7 is an outboard side view of a lower portion of the center side impact airbag module of FIG. 4.
Figure 8:
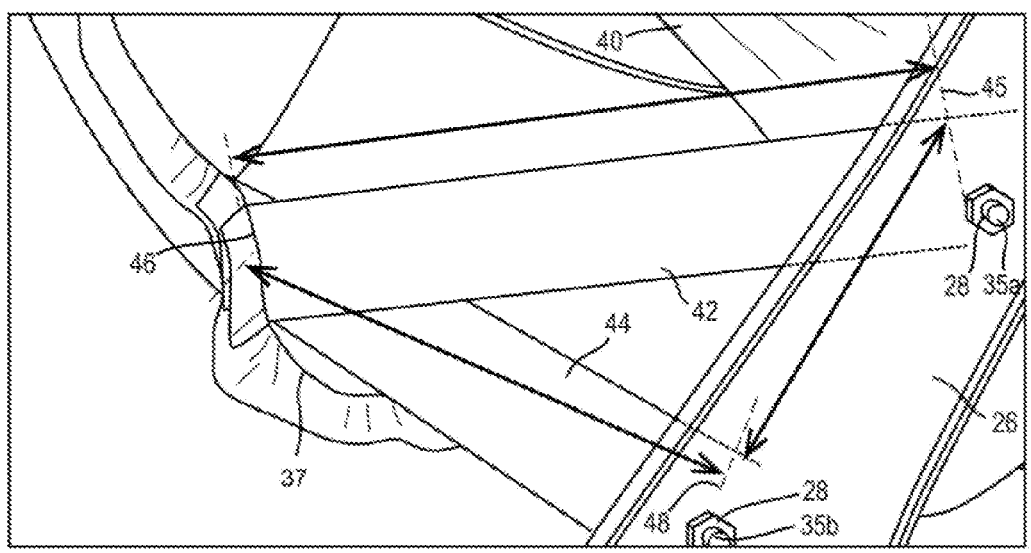
FIG. 8 is an outboard side view of a lower portion of another exemplary embodiment of a center side impact airbag module.

Referring now to FIGS. 7 and 8, the CSIAB module 30 further includes one or more than one tether that is configured to control the trajectory of the inflating cushion 32 and to support the inflated cushion 32 to better retain the occupant in the cross-car direction. Each tether may be formed of a fabric material (e.g., a woven nylon fabric) and may be coupled to one or more panels (e.g., a main panel) of the airbag cushion 32. While each tether 40, 42, and 44 is shown as a single component/element, in other embodiments, the tethers may include multiple components (e.g., multiple strips of fabric). As shown in FIG. 7, the CSIAB module 30 includes a main tether 40, a first tether 42, and a second tether 44. Each tether 40, 42, and 44 may be coupled to the airbag cushion 32 with stitching, an adhesive, or other suitable attaching device. The tethers 40, 42, and 44 are individually linked to the upper stud 35a or the lower stud 35b of the mounting bracket, the airbag cushion and/or the frame member 26. In other words, each end of each tether may be coupled to at least one of the upper stud, the lower stud, the mounting bracket, or the airbag cushion.

Each tether may be coupled to a forward portion of the airbag cushion, such as to a forward lower edge 37 of the cushion 32. The ends of two tethers may overlap one another, such as where two tethers are coupled to a common connection location. For example, one of the tethers 42, 44 may overlap with the other tether 42, 44 at the forward lower edge 37 of the cushion 32. Also, for example, one of the tethers 40, 42 may overlap with the other tether 40, 42 at the upper connection location (e.g., upper stud 35a). According to an exemplary embodiment, the tethers 40, 42, and 44 are coupled to the forward lower edge 37 of the cushion 32 via stitching along a single line (e.g., the stitch line 39 running along the periphery of the cushion 32). In other embodiments, one or more of the tethers 40, 42, or 44 may be coupled to the cushion 32 via stitching along multiple separate lines or by another suitable method. For example, the tether 40 may be coupled to a first forward (e.g., forward central edge) portion (e.g., position) of the airbag cushion 32 and the tethers 42, 44 may be coupled to a second forward (e.g., forward lower edge) portion (e.g., position) of the airbag cushion 32 using a common stitch line or separate stitch lines. The first forward portion may be located above the second forward portion of the airbag cushion 32 (see FIG. 7).

The tethers 42 and 44 are disposed on the occupant side of the airbag cushion 32 (e.g., the side of the airbag cushion 32 that is configured to be contacted by the occupant 14 when deployed). The tether 40 may extend through one or more apertures formed in airbag cushion 32 and may be disposed at least partially on either side of the airbag cushion 32. According to an exemplary embodiment, the tether 40 is routed through a pocket that is defined by a strap 43 formed by a pair of generally parallel slits 41. In another embodiment, the tether 40 is disposed entirely on the occupant side of the airbag cushion and may interact with the airbag cushion 32, such as by being routed through another feature (e.g., a pocket formed by a strip of fabric coupled to the occupant side of the airbag cushion). The tethers 40, 42, and 44 may form a substantially Z-shaped structure that reinforces the entire lower section of the cushion 32 to reduce bending or twisting of the cushion 32 when the cushion 32 is engaged (e.g., loaded) by the occupant 14 and without interaction with a console. The tethers 40, 42, and 44 facilitate the transmission of energy from the occupant 14 through the cushion 32 and the mounting bracket 33 into the frame member 26.

As shown in FIG. 7, the tether 40 has a first end that is configured to connect to one of the airbag cushion, a mounting member (e.g., the mounting bracket 33), and/or the seat frame at the upper location of the vehicle seat (e.g., the stud 35a) and a second end that is connected to a forward portion (e.g., first forward portion) of the airbag cushion 32 via stitch line 39. Also shown, the tether 42 has a first end that is configured to connect to one of the airbag cushion, the mounting member, and/or the seat frame at the upper location of the vehicle seat and a second end that is connected to a forward portion (e.g., second forward portion) of the airbag cushion 32 via a stitch line (e.g., stitch line 39). Also shown, the tether 44 has a first end that is configured to connect to one of the airbag cushion, a mounting member, and/or the seat frame at the lower location of the vehicle seat (e.g., the stud 35b) and a second end that is connected to the second forward portion of the airbag cushion 32. Thus, the ends of the tethers connecting to the locations of the vehicle seat (e.g., the frame member 26) may be configured to connect to, for example, the airbag cushion, the mounting bracket 33, and/or the frame member at the connection location(s). Further each connection location of a tether may be located proximate to the studs, rather than directly at the studs, and still transfer loads to the studs through the tether. As shown in FIG. 8, an end of the first tether 42 is coupled to the cushion 32 at an attachment point 45 (e.g., connection location, etc.) proximate the upper stud 35a and at an attachment point 46 (e.g., connection location, etc.) proximate the forward lower edge 37 of the cushion 32; and the second tether 44 is coupled to the cushion 32 at the attachment point 46 and at an attachment point 48 proximate the lower stud 35b.

Each tether 40, 42, 44 may be configured having a length that is less than a distance of the airbag cushion 32 between the two connection locations of the tether to place the tether in tension during deployment of the cushion. For example, the length of the first tether 42 may be less than the distance between the attachment points 45 and 46. Also, for example, the length of the second tether 44 may be less than the distance between the attachment points 46 and 48. The discrepancy between the lengths of the tethers 42 and 44 and the distances between the attachment points 45, 46, and 48 creates a tension through the tethers 42 and 44 and strengthens the inflated cushion 32 during deployment. The distance between the attachment points 45 and 48 at which the tethers 42 and 44, respectively, are coupled to the cushion 32 may be shorter than a distance between the studs 35a and 35b (e.g., of the airbag cushion). When the cushion 32 is inflated and engaged by an occupant traveling laterally toward the center of the vehicle (e.g., a longitudinal axis running along the midline of the vehicle), the tethers 42, 44 counteract the tendency for the cushion 32 to both pivot about the lower edge 36 of the cushion 32 and to rotate about the stitch line 39 parallel to the forward edge of the frame member 26.

The Z-shaped configuration of the tethers 40, 42, 44 creates a structure that promotes occupant energy transmission from the occupant 14 into the inflated cushion 32 and the mounting bracket to the seat frame 24. The tethers (e.g., tethers 42, 44) form a structure that simulates the interaction between the center console 16 and an airbag cushion extending below the upper surface of the center console 16. The tethers (e.g., tethers 42, 44) improve the strength of the inflated cushion 32 at a lower volume and pressure compared to conventional airbag cushions. As noted above, the unsupported tethered cushions may have a volume of around 10 liters, whereas cushions supported by the console may have a volume of around 11 liters. Additionally, the operating pressure (e.g., functioning pressure) of the unsupported tethered cushions may be reduced, for example, by at least 30 kPa (e.g., from about 200 kPa to 170 kPa or less, according to an exemplary embodiment). The reduction in volume and operating pressure advantageously allows for the use of a smaller (e.g., output, size) inflator with the module. According to an exemplary embodiment, the inflator output can be reduced from a 220 kPa, 1.1 mol output to a 200 kPa, 0.89 mol output, when used to inflate the unsupported tethered cushions described in this application. Also, according to an exemplary embodiment, the size (e.g., length) of the inflator can be reduced from about 257 mm long to about 198 mm long. These reductions advantageously lead to a significant reduction in mass of the inflator, such as, for example from about 400 g to about 270 g. The reduced size of the inflator advantageously reduces the overall package size required by the module, which frees up space for additional components (e.g., more foam in the seat to improve comfort) or more cabin space, while the reduction in mass advantageously improves fuel economy/efficiency of the vehicle over its life. In addition, the Z-shaped system of the tethers 40, 42, 44 may be utilized to reduce lateral buckling and/or deflection of other unsupported airbag cushions (e.g., no interaction with another structure, such as a console) that are positioned such that a relatively large portion of the cushion is seated high on a mounting bracket.

In comparison to a conventional airbag cushion in which the lower portion of the cushion is supported by interaction between the inflated cushion and the center console 16, the tethers (e.g., tethers 42, 44) are less dependent on the internal pressure of the inflated cushion 32. A CSIAB module 30 including the tethers 40, 42, 44 may be utilized at a lower operating pressure than a similar module lacking the tethers.

In tests, an airbag cushion 32 with the Z-shaped arrangement of the tethers 40, 42, and 44 that is positioned such that the cushion 32 does not interact with the center console 16 has a restraint ability that is similar to a cushion having a higher operating pressure (e.g., at least 30 kPa higher) and interacting with the center console 16 up to 110 mm.

In a side collision, the tethers 40, 42, 44 restrain the cross-car trajectory of the cushion 32 and reduce the likelihood that the cushion will contact the console 16. The tethers (e.g., tethers 42, 44) control the lower inflated cushion portion so that there is a reduced possibility of the cushion catching or hanging up on the edge of the center console 16 regardless of the position of the seat 12 (e.g., fore/aft position). While the cushion 32 is shown and described above as a non-interaction cushion (e.g., a cushion 32 designed such that it does not interact with the center console 16), the arrangement of tethers (e.g., tethers 42, 44), may be utilized in airbag modules with an airbag cushion that interacts with the center console to reduce the likelihood that the supported airbag cushion will become caught on the center console during deployment.

By simulating the interaction between the lower portion of an airbag cushion and the center console, the tethers (e.g., tethers 42, 44) allow for the 32 cushion to be a smaller body that does not interact with the center console 16. The volume and size of the cushion 32 may therefore be reduced for easier packaging, as noted above. Further, because the restraint provided to the cushion 32 by the addition of one or both tethers 42, 44 is less dependent on the internal pressure of the cushion 32 than an interaction between the cushion 32 and the center console 16, the cushion 32 may be inflated at a lower pressure with a smaller inflator 34, reducing the stress on the cushion 32 and further improving the packaging of the CSIAB module 30. The tethers (e.g., tethers 42, 44) improve the deployment trajectory of the cushion 32 and improves the likelihood that the cushion 32 will be deployed in-position in vehicle environments with large seat travel.

For purposes of this disclosure, the term "coupled" means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with interaction the two components or the two components and any additional member being attached to one another. Such joining may be permanent in nature or alternatively may be removable or releasable in nature.

It is important to note that the construction and arrangement of the airbag module as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosure herein. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. Other substitutions, modifications, changes and omissions may be made in the design, operating conditions and arrangement of the exemplary embodiments.

What is claimed is:

1. A center side impact airbag module that is mountable to an upper location and a lower location of a vehicle seat such that the upper location of the vehicle seat is different from and spaced apart from the lower location of the vehicle seat, the airbag module comprising:
   an inflator;
   an inflatable airbag cushion;
   a first tether having a first end connected to the vehicle seat at the upper location of the vehicle seat and a second end connected to a forward portion of the airbag cushion; and
   a second tether having a first end connected to the vehicle seat at the lower location of the vehicle seat and a second end connected to the forward portion of the airbag cushion, wherein
   the second end of the first tether and the second end of the second tether extend from the forward portion of the airbag cushion to the vehicle seat in a substantially V-shaped configuration such that a convergence point of the V-shaped configuration is located at the forward portion of the airbag.

2. The airbag module of claim 1, wherein a length of the first tether is less than a distance of the airbag cushion between the upper location of the vehicle seat and the forward portion of the airbag cushion, and wherein a length of the second tether is less than a distance of the airbag cushion between the lower location of the vehicle seat and the forward portion of the airbag cushion.

3. The airbag module of claim 2, wherein the first tether and the second tether are disposed on a side of the airbag cushion that is configured to be contacted by an occupant when deployed.

4. The airbag module of claim 3, wherein the forward portion is a forward edge of the airbag cushion.

5. The airbag module of claim 4, wherein one of the first tether and the second tether overlaps the other of the first and second tethers at the second end of the one of the first tether and the second tether.

6. The airbag module of claim 1, further comprising a third tether having a first end configured to connect to one of the airbag cushion, a mounting member and the vehicle seat at the upper location of the vehicle seat and a second end connected to a second forward portion of the airbag cushion.

7. The airbag module of claim 6, wherein the second forward portion of the airbag cushion is located above the first forward portion of the airbag cushion, such that the first, second and third tethers form a substantially Z-shape.

8. The airbag module of claim 7, wherein the first, second, and third tethers are disposed on a side of the airbag cushion that is configured to be contacted by an occupant when deployed.

9. The airbag module of claim 6, wherein the second ends of the first, second, and third tethers are secured to the first and second forward portions of the airbag cushion via stitching along a single line.

10. A center side impact airbag module that is mountable to a vehicle seat, the airbag module comprising:
an inflatable airbag cushion;
a first tether having a first end connected to an upper portion of the vehicle seat at a first connection location and a second end connected to a first forward portion of the airbag cushion at an edge of the airbag cushion; and
a second tether having a first end connected to the upper portion of the vehicle seat at the first connection location and a second end connected to a second forward portion of the airbag cushion at the edge of the airbag cushion; and
a third tether having a first end connected to a lower portion of the vehicle seat at a second connection location and a second end connected to the second forward portion of the airbag cushion at the edge of the airbag cushion, wherein
the second connection location is spaced apart from the first connection location, and
the second end of the second tether and the second end of the third tether extend from the second forward portion of the airbag cushion to the vehicle seat in a substantially V-shaped configuration such that a convergence point of the V-shaped configuration is located at the second forward portion of the airbag cushion.

11. The airbag module of claim 10, wherein the first tether is routed through a pocket of the airbag cushion, wherein the pocket is defined by a strap of the airbag cushion extending over a portion of the first tether.

12. The airbag module of claim 11, wherein the first end of the first tether is sandwiched between the first end of the second tether and the airbag cushion.

13. The airbag module of claim 10, wherein a length of the second tether is less than a distance of the airbag cushion between the first connection location and the second forward portion of the airbag cushion and wherein a length of the third tether is less than a distance of the airbag cushion between the second connection location and the second forward portion.

14. The airbag module of claim 10, wherein a seat member is on a side of the seat that is adjacent to a vehicle console, and wherein the inflatable airbag cushion is configured to deploy to a position that is adjacent the side of the seat and above the console without contacting the console.

15. A center side impact airbag module that is mountable to a vehicle seat member at first and second locations, the airbag module comprising:
an inflatable airbag cushion;
a mounting member configured to mount to the vehicle seat member at the first and second locations; and
a substantially Z-shaped tether system configured to influence the trajectory of the airbag cushion upon deployment, wherein the tether system comprises:
a first portion extending between a first portion of the airbag cushion and the mounting member at the first location of the vehicle seat member; a second portion extending between the mounting member at the first location of the vehicle seat member and
a second portion of the airbag cushion; and
a third portion extending between the second portion of the airbag cushion and the mounting member at the second location of the vehicle seat member.

16. The airbag module of claim 15, wherein the first, second, and third portions are individual elements.

17. The airbag module of claim 15, wherein a first end of the second portion of the tether system overlaps an end of the first portion, and wherein a second end of the second portion of the tether system overlaps an end of the third portion.

18. The airbag module of claim 15, wherein a length of the second portion of the tether system is less than a distance between the mounting member at the first location of the vehicle seat and the second portion of the airbag cushion, and wherein a length of the third portion of the tether system is less than a distance between the mounting member at the second location of the vehicle seat and the second portion of the airbag cushion.

19. The airbag module of claim 18, wherein a length of the first portion of the tether system is less than a distance between the mounting member at the first location of the vehicle seat and the first portion of the airbag cushion.

* * * * *